Nov. 18, 1969  G. PERONA ET AL  3,478,412
METHOD OF WELDING SINTERED ALUMINUM POWDER
Filed July 8, 1966

INVENTORS
GIOVANNI PERONA
GIUSEPPE VOLTA

BY *Stevens, Davis, Miller & Mosher*
ATTORNEYS

United States Patent Office 3,478,412
Patented Nov. 18, 1969

3,478,412
METHOD OF WELDING SINTERED ALUMINUM POWDER
Giovanni Perona, Milan, and Giuseppe Volta, Ispra, Italy, assignors to Centro Informazioni Studi Esperienze s.r.l. (C.I.S.E.), Milan, Italy, and European Atomic Energy Community (EURATOM), Brussels, Belgium
Filed July 8, 1966, Ser. No. 564,524
Claims priority, application Italy, July 17, 1965, 7,066/65
Int. Cl. B23k *19/00*
U.S. Cl. 29—472.9                           6 Claims

ABSTRACT OF THE DISCLOSURE

A process for hermetically sealing an end of a fuel element sheath of sintered aluminum wherein a sealing plug is inserted within the sheath and said sheath and said plug are heated and hammered with a rotary hammer so that said plug is welded to said sheath by intermetallic diffusion.

---

Figure 1:
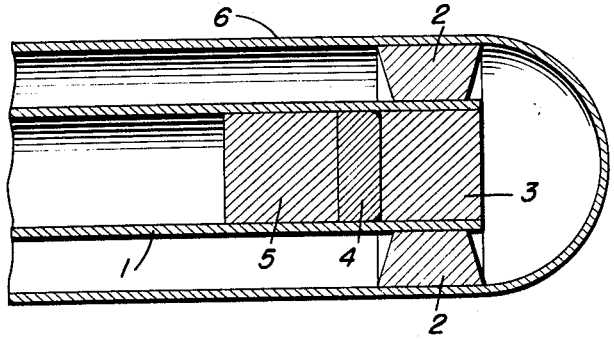

This invention relates to the welding of sintered aluminum, and especially, but not exclusively, to the hermetic sealing of the ends of the fuel elements for nuclear reactors, which elements have sheaths of such material.

One of the main difficulties encountered in the use of sintered aluminum hardened by dispersion (i.e. the composite material Al-Al$_2$O$_3$) which is commonly used commercially and known as S.A.P. (sintered aluminum powder) and can be used especially for the construction of nuclear reactors, is the impossibility of welding this material by normal methods without impairing its mechanical properties.

According to the present invention, sintered aluminum is welded by hot diffusion with plastic deformation, effected by hot hammering. Welding in this way does not unduly modify the structure of the material or impair its mechanical properties.

An example in which welding by rotary hammering may be used is the sealing of the ends of S.A.P. tubular sheaths of reactor fuel elements.

Nevertheless, although rotary hammering is at present the only possible or at least the best practical solution of the problem, there are certain difficulties due to the geometric conditions imposed, and this invention provides, in its more specific forms, special means for overcoming those difficulties in respect of sealing the ends of tubular sheaths by means of plugs.

The main difficulties involved in welding a plug to the end of a fuel element sheath, that is the welding of a cylindrical joint of the aforementioned materials, are due to the need to work on an already finished piece which can only be fed into the hammer for the short length to be welded, thereby limiting the choice of the profile of the matrices; difficulties are also due to the need to reduce the thickness of the material considerably in a very short distance, whereas a rotary hammer is naturally adapted for gradual variations distributed along the axis. In the case of S.A.P., considerable variations in thickness are required for welding by the diffusion of the material. Furthermore, hot S.A.P. readily oxidises.

These difficulties have been overcome or reduced according to this invention by the following means.

Either: (1) The adoption of a solid plug of S.A.P. inserted in the sheath; and (2) the addition of an outer collar of S.A.P. corresponding with the inner, solid plug.

Or: (3) The addition of an outer collar, corresponding with an inner, hollow plug of S.A.P., and a second plug of hard material within the first plug and inserted in the cavity of the same.

The outer, deformable collar and the solid plug, or hollow plug with a second, inner plug, are used to deform the materials to the desired degree, so as to weld the sheath to the plug without necessarily welding the collar to the sheath.

And: (4) The adoption, to protect the S.A.P. from oxidation which would impair the properties of the material and impede welding, of a shell of material that is plastic at working temperature, for example aluminum, which shell encloses the part to be hammered so that it can be kept under vacuum or in an inert gas.

EXAMPLE 1

The accompanying FIGURE 1 shows the arrangement and form of the parts at one end of a fuel element sheath prepared for hammering. 1 is the sheath of the fuel element, made of S.A.P.; 2 is a collar which forms a shocks transmitting ring and an additional weld material, also of S.A.P.; 3 is the sealing plug of the same material; 4 is a spacer pellet; 5 is a main fuel pellet, and 6 is a protective aluminum shell. The element is subjected, in the arrangement shown, to the action of the hammering machine for the hammering operation; this is carried out, for example, at a temperature of about 500° C., the duration of each series of blows being about 5 seconds and the frequency of the blows about 3000 a minute.

Figure 2:
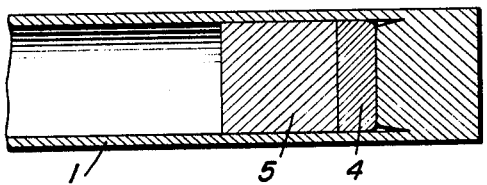

Preferably, degassing under vacuum at a temperature equal to or higher than the welding temperature is carried out beforehand on the parts to be welded. After hammering, the shell 6 is removed by mechanical treatment. FIGURE 2 shows the finished end of a fuel element obtained by the hammering process using a swaging machine.

EXAMPLE 2

Figure 3:
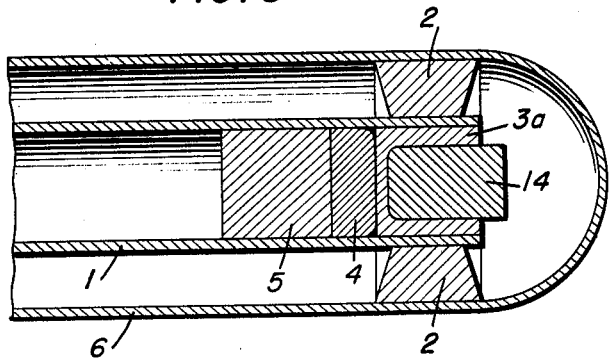
Figure 4:
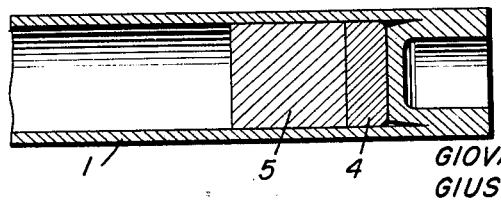

FIGURE 3 shows an arrangement using, instead of a solid plug, a hollow plug with a second, hard plug. In the drawing, 1 is the sheath; 2 is the collar; 3a is the hollow plug, made of S.A.P. like the two preceding parts; 14 is a steel second plug; 4 is the spacer pellet; 5 is a main fuel pellet, and 6 is the protective aluminum shell. The element is subjected, in the arrangement shown, to the action of the hammering machine for the hammering operation, FIGURE 4 shows the finished end of the fuel element after the removal of the shell and the steel plug.

What we claim is:

1. A process for hermetically sealing an end of a fuel element sheath of sintered aluminum, comprising the steps of inserting a sealing plug of sintered aluminum within the sheath at said end thereof, heating said sheath and said plug, and hammering said sheath and said plug with a rotary hammer so that said plug is welded to said sheath by intermetallic diffusion.

2. A process as claimed in claim 1, wherein said step of hammering is carried out with the sheath and the plug in an inert atmosphere or in a vacuum within a shell made of metallic material which is plastic at working temperature.

3. A process as claimed in claim 1, further comprising the step of placing a collar of plastic metallic material on said sheath and around said plug, said collar being subjected to the hammering.

4. A process as claimed in claim 3, in which the collar remains welded to the sheath after hammering.

5. A process as claimed in claim 3, in which the collar is removed after the welding of the material of the sheath and the plug.

6. A process as claimed in claim 3, wherein said plug is hollow and its cavity receives a second plug of hard material for facilitating the welding of the edge of the hollow plug to the sheath.

References Cited

UNITED STATES PATENTS

| | | | |
|---|---|---|---|
| 2,946,120 | 7/1960 | Jones et al. | 29—470 |
| 3,247,591 | 4/1966 | Panseri | 29—497.5 X |
| 3,367,021 | 2/1968 | Beghi et al. | 29—472.9 |

OTHER REFERENCES

Fuel Element Fabrication, International Atomic Energy Agency, vol. 1, pp. 153–154, 1961.

JOHN F. CAMPBELL, Primary Examiner

J. L. CLINE, Assistant Examiner

U.S. Cl. X.R.

29—474.3, 482, 497.5, 500